(12) United States Patent
García-Conde Noriega et al.

(10) Patent No.: US 9,423,156 B2
(45) Date of Patent: Aug. 23, 2016

(54) REFLECTOR ELEMENT FOR A SOLAR HEAT REFLECTOR AND THE METHOD FOR PRODUCING THE SAME

(75) Inventors: Ignacio García-Conde Noriega, Santa Cruz de Mieres-Asturias (ES); Josep Ubach Cartategui, Santa Cruz de Mieres-Asturias (ES)

(73) Assignee: RIOGLASS SOLAR, S.A., Santa Cruz de Mieres-Asturias (ES)

( * ) Notice: Subject to any disclaimer, the term of this patent is extended or adjusted under 35 U.S.C. 154(b) by 0 days.

(21) Appl. No.: 13/159,762

(22) Filed: Jun. 14, 2011

(65) Prior Publication Data

US 2011/0242647 A1 Oct. 6, 2011

Related U.S. Application Data

(63) Continuation of application No. 12/051,456, filed on Mar. 19, 2008, now abandoned.

(30) Foreign Application Priority Data

Feb. 26, 2008 (EP) .................................... 08380058

(51) Int. Cl.
*G02B 5/10* (2006.01)
*F24J 2/10* (2006.01)
*F24J 2/14* (2006.01)
(Continued)

(52) U.S. Cl.
CPC ................. *F24J 2/1057* (2013.01); *F24J 2/14* (2013.01); *G02B 5/10* (2013.01); *G02B 7/183* (2013.01); *F24J 2/5243* (2013.01); *Y02E 10/45* (2013.01)

(58) Field of Classification Search
CPC ... Y02E 10/47; Y02E 10/52; G02B 19/0062; G02B 7/183; H01L 31/0547
USPC ....... 359/853, 846, 850, 851, 864, 867–869, 359/883–884; 427/162–169; 12/688–691; 136/206; 126/569–713
See application file for complete search history.

(56) References Cited

U.S. PATENT DOCUMENTS 4,234,856 A * 11/1980 Jung et al. ...................... 372/90
4,285,992 A * 8/1981 Buckwalter, Jr. ............. 427/165
(Continued)

FOREIGN PATENT DOCUMENTS

CA 2008166 A 7/1990
DE 2602504 A1 7/1977
(Continued)

OTHER PUBLICATIONS

Glasstech World, "CRB-P Engineered for Burgeoning Concentrated Solar Power Industry," Fall 2007.
(Continued)

*Primary Examiner* — Bumsuk Won
*Assistant Examiner* — Tamara Y Washington
(74) *Attorney, Agent, or Firm* — Tristan A. Fuierer; Marianne Fuierer; Moore & Van Allen, PLLC

(57) ABSTRACT

Reflector element (1) for a solar collector including a not mechanically flexed monolithic glass pane (2) of heat treated glass which due to its enhanced resistance properties becomes self-supported without requiring the presence of any kind of frame member or device to maintain its shape at the normal utilization temperatures. The reflector element is substantially parabolic and can be provided with at least one bore (3) for a fixing element to fix the reflector element (1) to a supporting structure.

25 Claims, 4 Drawing Sheets

(51) Int. Cl.
  *G02B 7/183* (2006.01)
  *F24J 2/52* (2006.01)

(56) References Cited

U.S. PATENT DOCUMENTS

| | | | |
|---|---|---|---|
| 4,291,946 A | 9/1981 | van der Lely | |
| 4,337,997 A | 7/1982 | Sadoune et al. | |
| 4,759,788 A * | 7/1988 | Ward | 65/114 |
| 4,978,207 A | 12/1990 | Gillner et al. | |
| 5,253,105 A | 10/1993 | Paul et al. | |
| 7,162,893 B2 | 1/2007 | Serrano et al. | |
| 2004/0042225 A1* | 3/2004 | Dealey et al. | 362/487 |
| 2006/0288737 A1 | 12/2006 | Sayahi | |
| 2007/0223096 A1* | 9/2007 | O'Connor et al. | 359/584 |

FOREIGN PATENT DOCUMENTS

| | | |
|---|---|---|
| DE | 3902596 A1 | 8/1990 |
| EP | 0301755 A2 | 1/1989 |
| EP | 0529579 A | 3/1993 |
| EP | 1559690 A1 | 3/2005 |
| EP | 1559690 A1 * | 8/2005 |
| GB | 822842 A | 11/1959 |
| JP | 57-198403 A1 | 6/1982 |
| WO | 9518772 A1 | 7/1995 |
| WO | 2007108837 A1 | 9/2007 |
| WO | 2007108861 A1 | 9/2007 |

OTHER PUBLICATIONS

US Glass Metal & Glazing, Issue 11, Nov. 2007.
ENEA Activities on CSP Technologies; Parabolic Trough Workshop, Feb. 13-14, 2006.
Jay Molter, Declaration, Jul. 26, 2011.
European Opposition, EP 2096375, Aug. 1, 2011.

* cited by examiner

REFLECTOR ELEMENT FOR A SOLAR HEAT REFLECTOR AND THE METHOD FOR PRODUCING THE SAME

CROSS REFERENCE TO RELATED APPLICATIONS

This application is filed under the provisions of 35 U.S.C. §120 and is a continuation of U.S. patent application Ser. No. 12/051,456, filed on Mar. 19, 2008 and entitled "A Reflector Element for a Solar Heat Reflector and the Method for Producing the Same" in the name of Ignacio Garcia-Conde Noriega, which claims priority to European Patent Application No. EP08380058.1, filed Feb. 26, 2008 both of which are incorporated herein by reference in their entirety.

TECHNICAL FIELD

The present invention relates to a reflector element for use in a solar heat reflector or the like, a solar heat reflector comprising at least one of those reflector elements, a solar heat reflecting installation comprising at least one those solar reflectors, and to a method of manufacturing the reflector element.

DESCRIPTION OF RELATED ART

Technologically advanced societies have become increasingly dependent on energy. As populations and living standards rise, the demand for energy grows and this trend will continue in the future. Consequently, the capability of a nation to satisfy its energy need plays a crucial role in its economic output and in its inhabitants' quality of life. Fossil fuels are currently the most used energy resources. The dependence on these non-renewable exhaustible fuels raises environmental concerns and is a source of regional and global conflicts.

As the need for energy grows and the reserves of fossil fuels are being depleted, governments all over the world are facing the challenge of establishing initiatives to develop efficient renewable energy technologies for the use and production of energy obtained from natural sources such us wind, sunlight, tides, waves or geothermal heat.

Sunlight is seen as one of the most promising among renewable energy resources, since it is clean, reliable, environment respectful, endless and free. Nevertheless, in order to meet the world's growing energy needs, it is essential a further development, both in research and applications, of technologies for collecting, accumulating and harnessing solar energy, so costs are reduced and efficiency improved, making this energy worldwide competitive.

Electricity can be generated from the sun in several ways. Photovoltaic systems, also known as PV systems, have been mainly developed for small and medium-sized applications due to the high price of photovoltaic cells although new multi-megawatt PV plants have been built recently. For large-scale generation, concentrating solar thermal power plants have been more common. These systems comprise solar collectors which use lenses or mirrors to concentrate a large area of sunlight onto a receiver, through which a working fluid flows, which is heated before transferring its heat to a boiler or power generation system.

Solar collectors are known in the art. They usually include at least one mirror that reflects incident light to a focal location such as a focal point or line. A solar collector can include one or more mirrors that reflect incident sunlight and focus the light at a common location. A cost-effective collector consists of a linear parabolic reflector that concentrates light onto a receiver positioned along the reflector's focal line. A liquid (e.g., water, oil, or any other suitable thermal liquid) to be heated, may be positioned at the focal point of the mirror so that the reflected sunlight heats the liquid and energy can be collected from the heat or steam accumulated by the liquid.

A conventional method to produce a parabolic reflector consists on hot-bending. A glass substrate is bent on a approximately parabolic shape mould using high temperatures and once slowly cooled, a reflective coating is applied either on the concave or the convex side of the bent glass substrate. A drawback of a parabolic reflector thus produced is that the hot-bending may cause some distortions which lead to optical deficiencies and sun energy reflection loss. Other drawbacks are the low bent glass production rate achieved when using this manufacturing methodology and the low resistance of the glass panes to the wind loads and the accidental impacts against them.

An alternative method for producing a parabolic reflector is described in documents WO 2007/108837 and WO2007/108861. Said method comprises forming a reflective coating on a flat glass substrate, using a mould member to cold-bend the glass substrate and applying a frame member to the cold-bent glass substrate to mechanically maintain the cold-bent glass substrate in a bent shape. By frame member it is meant any solid element which is applied to the bent glass substrate in order to maintain it in its bent shape and without which element the glass substrate would recover its initial flat shape. For example a frame, an additional pre-bent glass or metal sheet, or a thermoplastic member. The method set forth in said documents has some limitations and drawbacks, among which:

The glass substrate must necessarily be sufficiently flexible to be cold-bent, said flexibility being usually provided by making a relatively thin glass substrate.

As abovementioned, parabolic reflectors produced by this method need to be maintained in their bent shape by a frame member, otherwise they would recover their flat shape.

Document U.S. Pat. No. 4,337,997 describes an alternative energy reflector and a method for producing the same. In that case a flexible glass substrate is included in a laminate with a metal ply and the laminate is subjected to flexing forces, causing its flexure within the elastic limit of the metal ply. The relative thicknesses of the metal and glass plies and the bonding means between them need to be suitably chosen, so the glass ply is not subjected to tensile stress when the laminate is flexed.

In document JP57198403 a curved reflector is disclosed including a mirror which comprises a thin plate-like chemically tempered glass, a reflective coating and a protective coating, which mirror is mechanically curved along the surface of a rigid member at room temperature.

Chemical tempering strengthens glass by putting the surface of the glass into compression, due to an exchange of ions. In a chemical tempering process a piece of glass is submersed in a bath of molten salt at a prescribed temperature. The heat causes the smaller ions to leave the surface of the glass and the larger ions present in the molten salt to enter it. Once the piece of glass is removed from the bath and cooled, it shrinks. The larger ions that are now present in the surface of the glass are crowded together. This creates a compressed surface, which results in a stronger glass with an increased resistance to breaking. This method of chemical tempering is time-demanding, low manufacturing rated and very expensive.

Ordinary annealed glass, without special treatment, is widely used in the technical field of the invention. However, this glass can become fragile when exposed to wind loads, impact of solids in the open air and when be provided with bores it cannot bear the necessary mounting or fixing stresses.

Therefore it is an object of the present invention to provide an improved reflector for a solar heat collector, which solves the abovementioned drawbacks present in the reflectors comprised in the prior art, i.e., a reflector with the appropriate optical properties, resistant and which does not require the use of a frame member to maintain its curved shape. A second object of the present invention is to provide an efficient method for producing such a reflector, which is cheap, simple and reproducible.

SUMMARY OF THE INVENTION

This and other objects of the invention are achieved by a reflector element for a solar heat reflector according to independent claim 1, a solar heat reflector according to independent claim 11, a solar heat reflecting installation according to independent claim 12 and a method for producing a reflector element for a solar heat reflector according to independent claim 13. Favourable embodiments are defined by the dependent claims.

A solar heat reflector according to the invention comprises a number of reflector elements which forms a substantially parabolic reflecting surface that reflects and concentrates incident sun radiation to a focal receiver which performs as a heat collector. Normally the heat reflector comprises four reflector elements following a substantially parabolic curve.

According to a first aspect of the invention, a reflector element for a solar heat reflector is provided, which comprises a self-supported curved not mechanically flexed monolithic piece of heat-treated glass pane and reflecting means.

The term 'not mechanically flexed' shall be understood throughout this document as a glass pane which is not flexible in a static situation and cannot be cold-bent, maintaining the desired and preformed curved or bent shape without the use of a frame member, rigid member or any other external force. These frame or rigid members has been used in the prior art to maintain the shape of the glass once this has been mechanically cold-bent.

'Monolithic' shall be understood throughout this document as a glass pane made of a single piece of glass in opposition to a multi-piece glass, such as laminated, that is composed of at least two glasses and one or several interlayer resins.

Heat-treatment of glass involves heating the glass to a temperature near its softening point and forcing it to rapidly cool under carefully controlled conditions. Heat-treated glasses can be classified as either fully tempered or heat strengthened, according to their surface compression degrees. The heat-treating process produces highly desirable conditions of induced stress which result in additional strength—achieving up to six times that of the normal annealed glass—, resistance to thermal shock and impact resistance. These improved conditions are especially advantageous for a reflector element to be used in a solar heat reflector located in the open air, usually in desert regions, where the collector is subjected to huge temperature variations and high wind loads in those large open spaces.

The heat-treating process for either, tempering or heat-strengthening glass, confers enhanced resistance properties to the reflector element of the invention. During said process, once the piece of heat-treated glass pane has been softened, it is bent in a continuous process to a curved shape suitable for a solar heat collector. The reflector element is preferably bent in a substantially parabolic shape but other shapes—such as cylindrical or spherical—can be envisaged for different embodiments of the invention.

'Substantially parabolic' shall be understood throughout this document as any transversal section of the reflector element of the invention that has a substantially parabolic shape. Such 'substantially parabolic' shape can be characterized by the intercept factor (IF). This factor is defined by the percentage of the whole incoming solar radiation that strikes the reflector and that is reflected on a tube of a 70 mm diameter (the linear receiver or absorbing tube) with its axis located along the theoretical focal line of the solar heat reflector. The IF factor of the reflector elements produced by the method herein described, have a minimum value of 95%.

In this sense a 'self-supported' glass pane shall be understood throughout this document as a glass pane which does not require the cooperation of a frame member or any other device to maintain its shape at the normal utilization temperatures, and that it is kept in its working position by the supporting structure. The absence of a frame member or other device in the reflector element of the invention to keep its curved shape results in material, money and time saving in its manufacturing and also has the advantage of a smaller weight and maintenance cost of the solar heat reflector.

A further advantage of the reflector element of the invention is that it comprises a monolithic glass, i.e. no lamination or combination of glass with other glass panes or other materials is needed.

The glass pane of the reflector element for a solar heat reflector according to the invention has preferably a thickness of equal or less than 5 mm, although thicker glass panes can be manufactured and used as reflectors in accordance with the invention.

The reflector element of the invention also comprises reflecting means, such as a reflecting coating or a layer of a reflecting element deposited either on its concave or convex side, the reflecting capabilities being provided by one or more coating layers, covered by one or more protecting layers of a protective element such as paint coats or adhesive films. The purpose of such protection layers being the preservation of the reflective behaviour of the reflector elements and the increase of the duration of the reflective coatings of the reflector element, normally installed in places where it is exposed to very aggressive environmental conditions.

When a reflective coating layer is applied on the convex side of the curved glass pane, the first protection layer of the reflector element of the invention comprise an antioxidant or passivation layer, chemically deposited directly on top of the reflecting layer, and on top of this first protection layer, an additional second or even more layers of paint are sequentially deposited to increase the weather resistance and durability of the reflecting layer.

The reflector element provided by the present invention has optimal optical properties, such as solar energy reflectance ($R_E$%) larger than 92% and light reflectance ($RL_{D65}$%) larger than 94% in the solar spectrum comprising 270 to 2500 nm, when measurements are made in accordance with ISO 9050:2003 with an 1.5 air mass value.

When thermally heat strengthened, the reflector element has compressive layers in both surfaces between 20 Mpa and 69 Mpa, resulting in improved mechanical properties with respect to typical annealed glass reflectors in use.

When thermally tempered, the reflector element has compressive layers in both surfaces in excess of 70 Mpa, resulting in improved mechanical properties with respect to typical annealed glass reflectors in use.

Due to its mechanical properties the reflector element of the invention can be provided with at least one bore without fracturing when submitted to mounting stresses. Said bore can be advantageously used to fix the reflector element to a supporting structure in the solar heat reflector by means of a fixing element and can have different diameter values depending on the required attachment of the reflector element to its supporting structure.

Other reflectors in the prior art would be easily fractured when submitted to mounting stresses in the bores, and therefore they need to be fixed to supporting structures via adhesive means, which are known to degrade when exposed to the ultra-violet sun radiation and the unfavourable environmental conditions typically found in the locations where solar heat collecting facilities use to be installed.

A second aspect of the invention is to provide a solar heat reflector comprising at least one reflector element according to the invention.

A third aspect of the invention is to provide a solar heat reflecting installation comprising at least one solar reflector according to the invention.

A fourth aspect of the invention is to provide a method for manufacturing the reflector element of the invention.

A flat annealed glass is cut by several potential means, such as diamond cutting wheel, milling, water jet, etc, to its desired perimeter shape and dimensions and then grinded to either flat or curved edge finishing. This edge grinding operation prevents glass from stress breaking due to the small surface cracks that normally appear on the glass edge in the cutting operations. After the edge grinding, one or more bores can be drilled in the glass plane depending on the reflector attachment method to its supporting structure. The edges of the holes in every side of the glass can be countersunk to smooth away the mechanical stress of the fixing devices that will be fixed through them.

As all these mechanical operations on glass are finished, the glass is carefully washed and dried. In the washing operations a common water washing is firstly conducted to remove sand glass coming from the edges' grinding and immediately after a demineralised water rinse is made to prevent water salt pollution deposits on the glass surfaces.

Drying of the glass is normally made by means of high speed cold or hot air angled projection on the glass surfaces.

The glass cut, edge grinded, drilled and cleaned is loaded on a bending furnace to conduct its bending and thermal stress treatment.

The glass is properly positioned on the loading table of the heating oven and progressively heated to its bending temperature by continuous, or step-by-step, travelling through the heating tunnel. Radiation with electrical heat sources or convection by means of hot air heating can be used to heat up the glass. As the glass reaches the desired temperature, it is rapidly moved to the bending section, where the glass is bended to its desired curved shape and immediately heat strengthened or tempered (heat treatment) with rapid cooling by means of violent air blowing on both glass sides. After this heat treatment the glass is cooled down to a normal handling temperature (under 50° C.) by continuous or discontinuous travelling in a cooling tunnel where it is blown with atmospheric air coming from one or several fans. Compressed air can also be used to apply cooling for strengthening of the glass.

Glass handling is made with special automatic or manual devices that allow easy displacement when loading and unloading operations are carried out.

All cutting, grinding and drilling operations are conducted on numerically controlled (NC) automatic machines. Also speed, water and air temperature in the washing and drying operations are PLC (programmable logic controller) controlled.

All these operations, including bending and tempering, are carried out in specific equipments which, in some way, are similar to those used in the glass industry such those used in the manufacturing of heat-treated glass, well known to the skilled person, like for example in the automobile industry.

Furnace parameters (glass speed, temperatures, bender operation, air pressure, etc), furnace operations and their coordination are fully automatic and controlled by means of a sophisticated computer control system.

The bent glass is then moved to a coating line to provide it with the necessary reflective capabilities, conducting a mirroring process, but specifically adapted to curved parabolic shape glass panes.

On the convex side of the bent glass, a reflective coating process is conducted comprising the application of a reflective layer, anti-oxidation or passivation layers, and several protective layers.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawings, in conjunction with the accompanying specification, in which.

Throughout the figures like reference numerals refer to like elements.

DETAILED DESCRIPTION OF A PREFERRED EMBODIMENT

Figure 1:
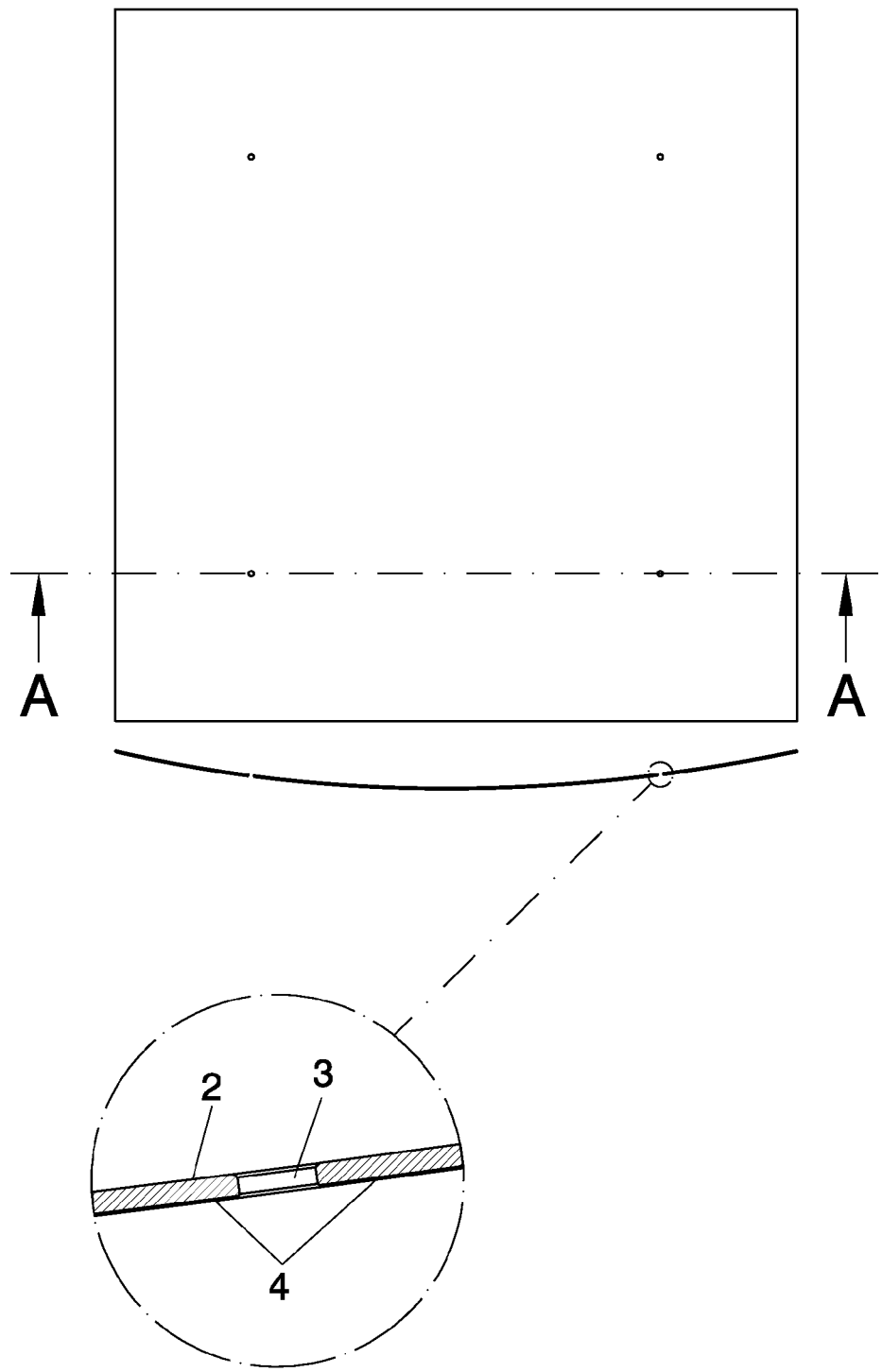
FIG. 1 shows top and side views of the parabolic reflector element of the invention.
Figure 2:
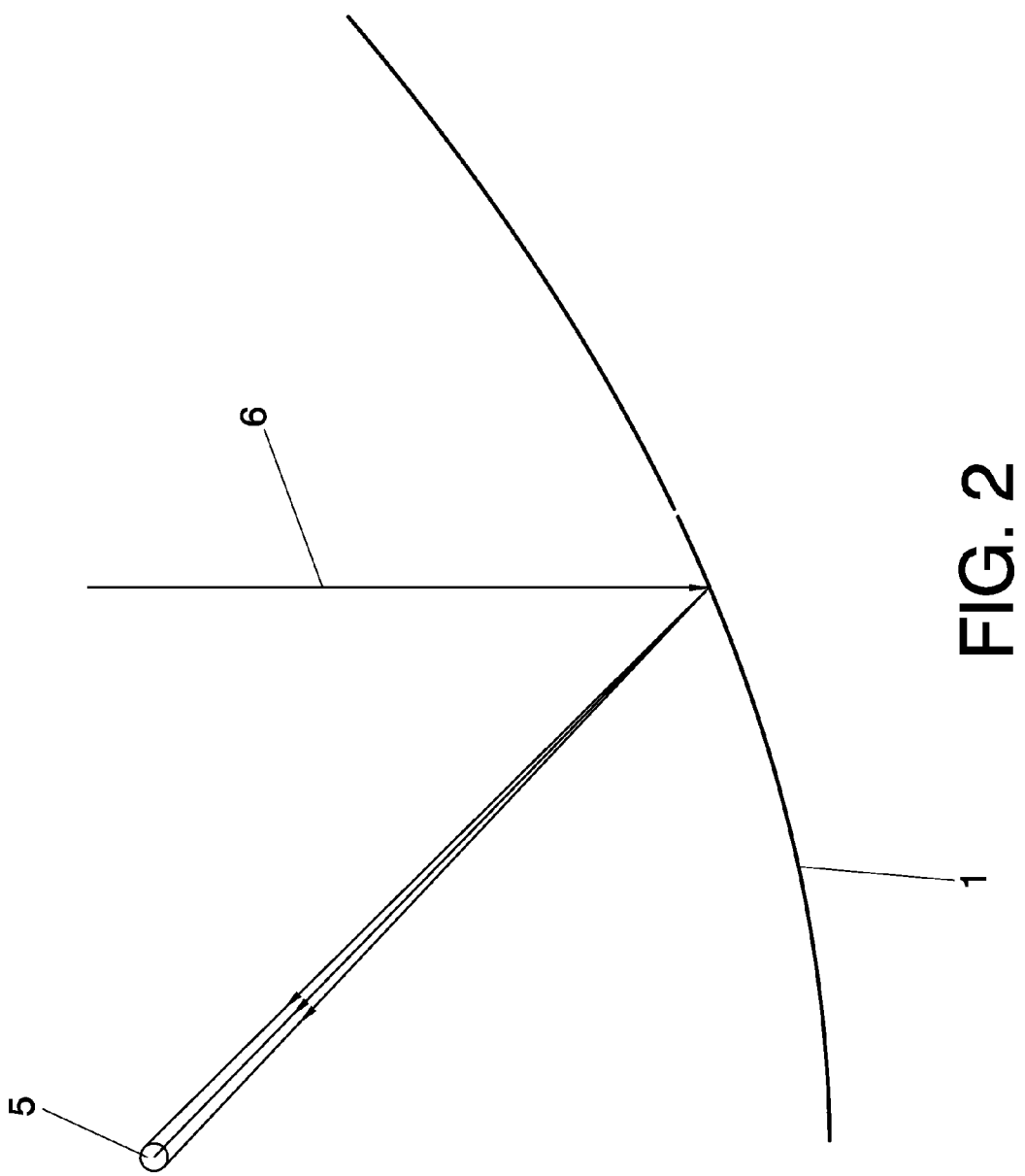
FIG. 2 shows the principle of reflection of an incident solar ray in a parabolic reflector element and the corresponding absorbing tube.

In FIG. 1 a reflector element (1) for a solar collector according to a preferred embodiment of the invention is shown in both, top and side—section AA—views. Said reflector element comprises a not mechanically flexed monolithic glass pane (2) of heat treated glass which due to its enhanced resistance properties becomes self-supported without requiring the presence of any kind of frame member or device to maintain its shape at the normal utilization temperatures. The principle of reflection of an incident solar ray (6) in a reflector element (1) and the corresponding absorbing tube (5) is shown in FIG. 2.

In an embodiment the thickness of the glass pane is equal or less than 5 mm.

Figure 3:
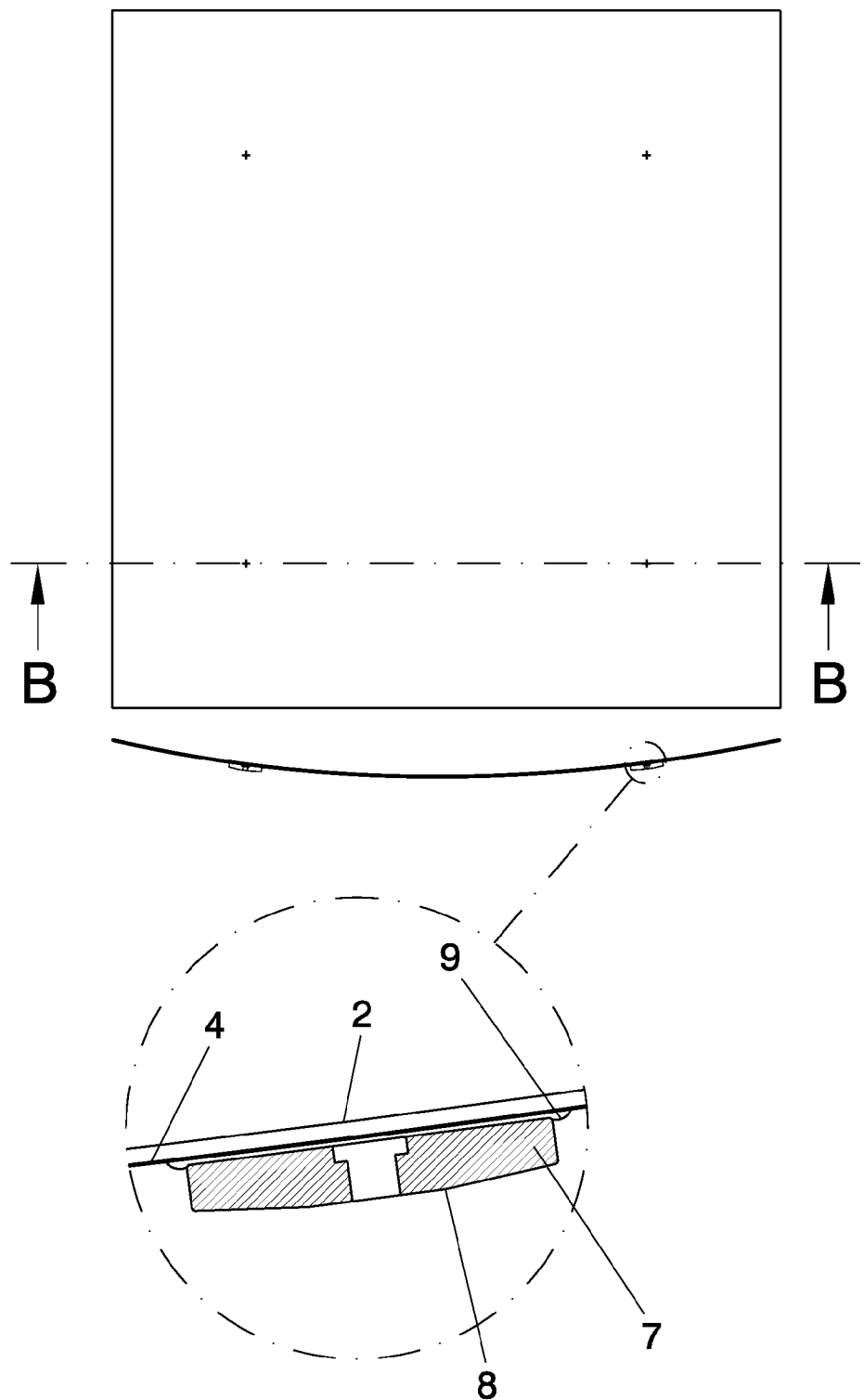
FIG. 3 shows top and side views of a reflector element with conventional mounting means.

FIG. 3 shows the reflector element (1) of the invention and a detail of a conventional mounting means (7) for fixing the reflector element (1) to a solar heat reflector's structure.

These conventional mounting means (7), which do not require bores in the reflector, comprises supporting pads (8) for installation on the collector structure attached to the reflector element's back surface (convex face) via an adhesive material (9). These mounting means are perfectly usable in the reflector element of the invention.

In a further embodiment four bores (3) have been made through the glass pane thickness (2) to provide housing for mounting elements through which the reflector element (1) will be fixed to the solar collector structure. One detail of a bore (3) is shown in FIG. 1.

On the convex face of the glass pane (2), a reflective layer (10) made of chemically deposited silver, an antioxidant or passivation layer made of chemically deposited copper (11), and three layers (12-14) of paint have been applied to provide the reflecting and weathering endurance characteristics to the reflector element.

Figure 4:
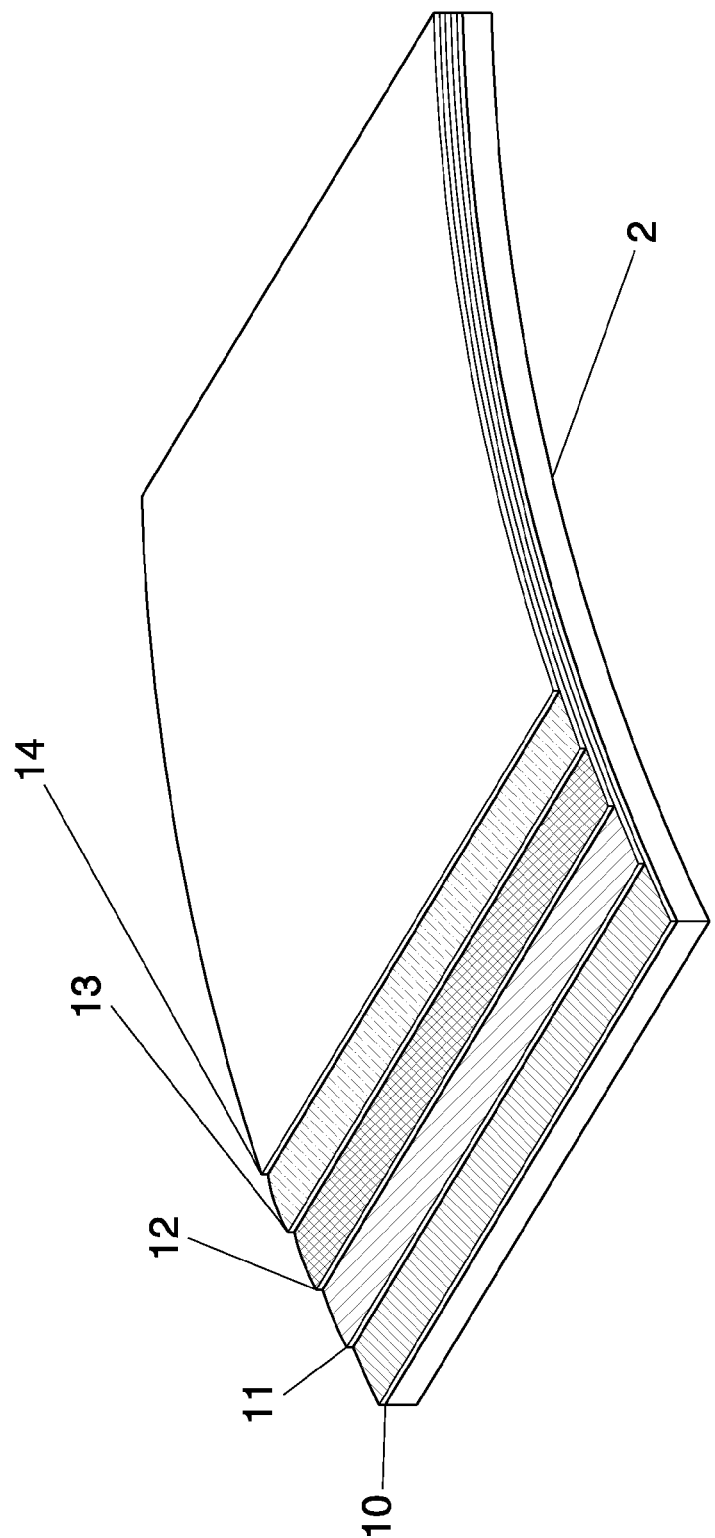
FIG. 4 shows a preferred configuration of the reflective and protection layers applied to the reflector element's convex side.

In FIG. 4 the composition of the reflective (10) and protective layers (11-14) applied to the reflector element's convex face according to a preferred embodiment of the invention are shown.

The method of producing the reflector element of the invention comprises the steps of:
- cutting off an annealed glass,
- grinding the edges of the cut glass pane,
- washing the glass pane,
- loading the glass pane in a bending furnace for its bending until the desired curved shape,
- heat treatment of the glass pane with rapid cooling in order to increase its strength,
- cooling down the glass pane to normal handling temperature, and
- application of a reflective coating.

In a particular embodiment the heat treatment is thermal heat strengthening or thermal tempering.

In a particular embodiment the step of edge grinding comprises the operation of drilling bores (3) in the glass pane (2). These bores (3) will be used by the corresponding mounting means to fix the reflector element to the solar heat reflector's structure.

In turn, the application of a reflective coating (10) and its protective layers (11-14) comprises the following steps.

The first step in the manufacture of the reflector element is the removal of all impurities and minor surface defects on the glass side to be coated. This is achieved by using a water suspension of a polishing material such as Cerium Oxide (CeO) in combination with water. The polishing is performed by feeding the polishing means into a station equipped with brushes that describe both, rotation and side to side movements. After the polishing operation is performed, the residual polishing powder is removed by demineralised water rinsing.

Glass sheets are then warmed up to near 25° C. by rinsing with hot water and then sprayed with a promoter adhesion solution made of Tin Chloride salt in water.

After water rinsing, the reflective layer (10) is created. The reflective surface (10) is composed of a chemically deposited layer of metallic silver that is created after two solutions. The first one is made of Silver Nitrate and the second one is made of a Reducer. Both are independently sprayed and mixed up on top of the glass surface. After allowing a reaction time, typically 1 to 2 minutes, glasses are rinsed with demineralised water followed by the application of an anticorrosion and antioxidant layer made of metallic Copper (11).

In a particular embodiment the layer of metallic silver (10) has a minimum thickness of 0.7 g/m$^2$.

The Copper (passivation) layer (11) is deposited after two water solutions; the first one containing copper sulphate and the second one being a suspension of iron powder. They are independently sprayed and mixed up on top of the previous reflecting layer (10). After allowing a reaction time of 1 to 2 minutes, glasses are rinsed with water and air dried before entering a heating tunnel for the final metal coats (10, 11) drying.

In a particular embodiment the layer of copper (11) has a minimum thickness of 0.3 g/m$^2$.

Further, the protective layers (12-14) of paint are applied on top of the metal coats (10,11) described.

The first out of three layers of paint or "basecoat" paint (12) is applied via a curtain coater followed by the corresponding infrared (IR)-curing furnace and an air cooling tunnel to reduce the glass temperature prior to the next step. In a particular embodiment the dry film thickness for the base coat (12) ranges from about 20 to 45 micron.

The second layer of paint or "intermediate" paint (13) is also applied in a curtain coater followed by the corresponding IR-curing furnace and an air cooling tunnel. In a particular embodiment, the dry film thickness for the intermediate paint (13) ranges from about 25 to 55 micron.

The third layer of paint or "top" coat (14) is also applied in a curtain coater with its corresponding IR-curing furnace and an air cooling tunnel. In a particular embodiment, the dry film thickness for the top coat (14) ranges from about 25 to 55 micron.

Once all the layers (10-14) composing the final mirror have been deposited, the reflector element goes through a final washing station provided with demineralised water, to remove any contamination caused during the process on its opposite, non-coated side, and then trough an air drying station to remove the moisture from the previous washing step.

After the coating process, the glass panes are moved to the fitting section where the fixing accessories are mounted of the glass panes by means of robotized equipment for an accurate, easy, rapid mounting of the fixing hardware on the calculated points of the reflector element for its attachment to the solar heat reflector' structure.

Finally the glass panes are safely packed and stocked for shipment to their final destination in the solar collecting facilities.

The invention claimed is:

1. A reflector element for a solar heat reflector consisting of a self-supported curved heat-treated single glass pane having a convex side, a reflecting coating deposited on the convex side of the single glass pane, an antioxidant or passivation layer chemically deposited on the reflecting coating and one or more protective layers deposited on the antioxidant or passivation layer, wherein the single glass pane does not require a frame member, rigid member or any other external force to maintain its curved shape at normal utilization temperatures.

2. The reflector element for a solar heat reflector according to claim 1, wherein the glass pane is heat-treated using thermal heat strengthening or thermal tempering.

3. The reflector element for a solar heat reflector according to claim 1, wherein the one or more protective layer comprises a base coat, an intermediate coat and a top coat.

4. The reflector element for a solar heat reflector according to claim 3, where the base coat has a dry film thickness in a range between about 20 to 45 microns, the intermediate coat has a dry film thickness in a range between about 25 to 55 microns, and the top coat has a dry film thickness in a range between about 25 to 55 microns.

5. The reflector element for a solar heat reflector according to claim 1, wherein it is substantially parabolic.

6. The reflector element for a solar heat reflector according to claim 1, wherein it is provided with at least one bore for a fixing element to fix the reflector element to a supporting structure.

7. The reflector element for a solar heat reflector according to claim 1, wherein the thickness of the glass pane is equal or less than 5 mm.

8. The reflector element for a solar heat reflector according to claim 1, wherein its energy reflectance ($R_E$%) is larger than 92% in the solar spectrum comprising 270 to 2500 nm, with an air mass value of 1.5.

9. The reflector element for a solar heat reflector according to claim 1, wherein its light reflectance ($RL_{D65}$%) is larger than 94% in the solar spectrum comprising 270 to 2500 nm, with an air mass value of 1.5.

10. The reflector element for a solar heat reflector according to claim 1, wherein when the glass pane is thermally heat strengthened, both surfaces of the reflector element have a compressive layer with strength in a range between about 20 Mpa and about 69 Mpa.

11. The reflector element for a solar heat reflector according to claim 1, wherein when the glass pane is thermally heat tempered, both surfaces of the reflector element have a compressive layer with strength in excess of 70 Mpa.

12. The solar heat reflector comprising at least one reflector element according to claim 1.

13. A solar heat reflecting installation comprising at least one solar heat reflector according to claim 12.

14. A method for producing the reflector element of claim 1 comprising the steps of
   i) cutting and edge grinding annealed glass to obtain a cut single glass pane,
   ii) washing the single glass pane,
   iii) loading the single glass pane in a bending furnace to bend same into the desired curved shape,
   iv) heat treating the single glass pane by heating and rapid cooling to increase its strength,
   v) cooling the single glass pane to normal handling temperature, and
   vi) applying a reflective coating, and protective layers to the convex side of the single glass pane.

15. The method according to claim 14, wherein the heat treatment is thermal heat strengthening.

16. The method according to claim 14, wherein the heat treatment is thermal heat tempering.

17. The method according to claim 14, wherein the bending furnace bends the single glass pane into a substantially parabolic shape.

18. The method according to claim 14, wherein the step i) of edge grinding additionally comprises the operation of drilling bores (3) in the glass pane.

19. The method according to claim 14, wherein the step vi) of applying a reflective coating and protective layers comprises the following steps:
   a) preparing the single glass pane by removing all impurities and minor surface defects on the glass side to be coated, polishing and further warming the single glass pane to a temperature of about 25° C.,
   b) depositing a layer of metallic silver on the convex side,
   c) depositing an anticorrosion and antioxidant layer made of metallic copper,
   d) applying a basecoat paint layer, curing in an infrared curing furnace and cooling to reduce the single glass pane temperature prior to the next step,
   e) applying an intermediate paint layer, curing in an infrared curing furnace and cooling to reduce the single glass pane temperature prior to the next step, and
   f) applying a top coat layer, curing in an infrared curing furnace and cooling to reduce the single glass pane temperature.

20. The method according to claim 19, wherein the step b) of depositing a layer of metallic silver comprises independently spraying a first solution and a second solution on top of the convex side of the single glass pane, wherein the first solution comprises silver nitrate and the second solution comprises a reducer.

21. The method according to claim 19, wherein the layer of metallic silver (10) is deposited in an amount of 0.7 g/m² or greater.

22. The method according to claim 19, wherein the step c) of depositing a layer of metallic copper comprises independently spraying a first solution and a second solution on top of the metallic silver layer, wherein the first solution comprises copper sulphate and the second solution comprises a suspension of iron powder.

23. The method according to claim 19, wherein the layer of metallic copper is deposited in an amount of 0.3 g/m² or greater.

24. The method according to claim 19, wherein the dry film thickness for the base coat is in a range between about 20 to 45 microns, the dry film thickness for the intermediate paint is in a range between about 25 to 55 microns, and the dry film thickness for the top coat is in a range between about 25 to 55 microns.

25. A reflector element for a solar heat reflector according to claim 1, wherein the single glass pane is not flexible in a static situation and cannot be cold-bent.

* * * * *